April 9, 1963    H. A. RASS    3,084,950
SHOCK ABSORBING WHEEL MOUNTING ASSEMBLY
Filed Aug. 11, 1961    2 Sheets-Sheet 1

INVENTOR.
HANS A. RASS,
BY
McMorrow, Berman & Davidson
ATTORNEYS.

April 9, 1963  H. A. RASS  3,084,950
SHOCK ABSORBING WHEEL MOUNTING ASSEMBLY
Filed Aug. 11, 1961  2 Sheets-Sheet 2
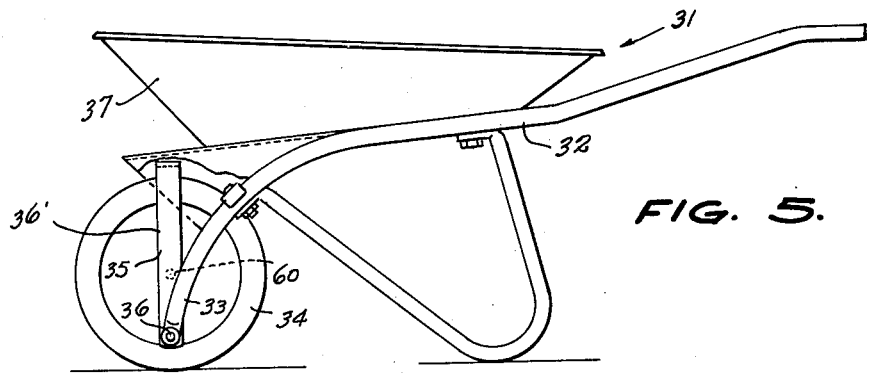
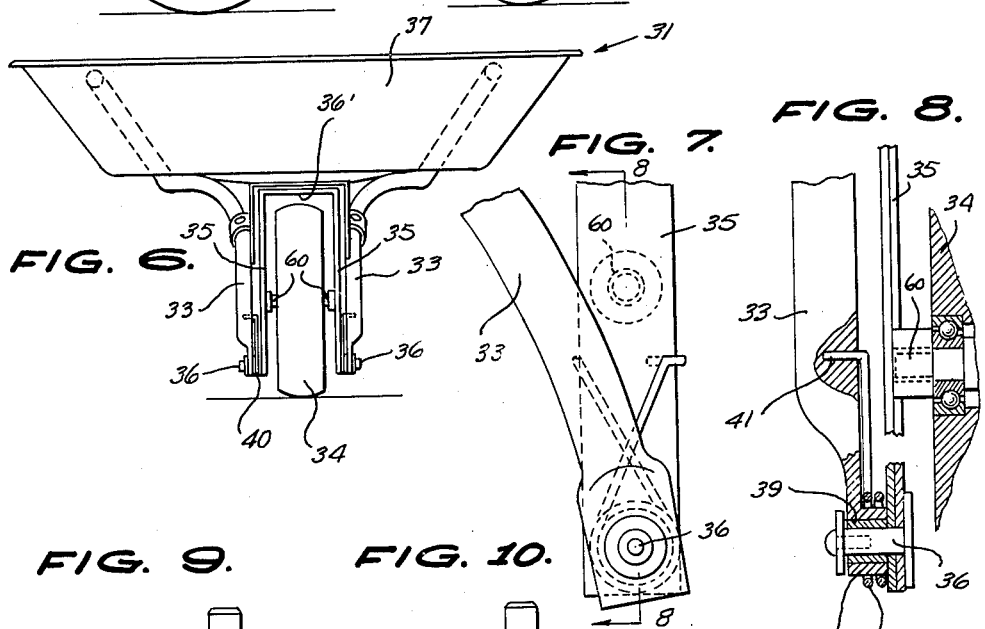
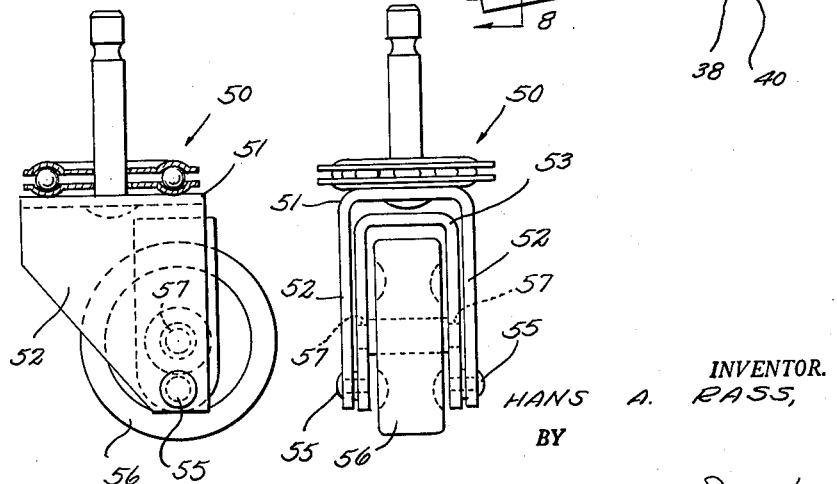
INVENTOR.
HANS A. RASS,
BY
McMorrow, Berman & Davidson
ATTORNEYS.

United States Patent Office 3,084,950
Patented Apr. 9, 1963

3,084,950
SHOCK ABSORBING WHEEL MOUNTING ASSEMBLY
Hans Anton Rass, 303 St. Lawrence, Beloit, Wis.
Filed Aug. 11, 1961, Ser. No. 130,945
2 Claims. (Cl. 280—80)

This invention relates to shock absorbing wheel mounting assemblies, and more particularly to a shock absorbing suspension linkage adapted to be employed in supporting a load on one or more ground-engaging wheels.

A main object of the invention is to provide a novel and improved shock absorbing assembly for use in connecting a load-supporting member to a ground-engaging wheel, the assembly being relatively simple in construction, involving simple parts, being easy to assemble, and being of general usefulness in conjunction with absorbing shocks between a load-supporting member and its supporting wheel or wheels.

A further object of the invention is to provide a new and improved shock absorbing connection between a load-supporting frame and a ground-engaging supporting wheel, the connection being arranged so that the wheel is allowed to swing relative to the frame, whereby irregularities in the ground tend to cause the wheel to swing relative to the frame rather than to cause shocks to be transmitted directly to the frame, the assembly involving inexpensive components, being durable in construction, and being applicable to a wide range of load-supporting devices including transport vehicles of all kinds.

Further objects and advantages of the invention will become apparent from the following description and claims, and from the accompanying drawings, wherein:

FIGURE 5 is a side elevational view, partly broken away, of a wheelbarrow provided with an improved shock absorbing assembly according to the present invention.

FIGURE 6 is a front elevational view of the wheelbarrow of FIGURE 5.

FIGURE 7 is an enlarged fragmentary elevational view showing the connection between one of the depending frame arms and the lower end portion of the link member employed in the wheelbarrow of FIGURES 5 and 6.

FIGURE 8 is a vertical cross sectional view taken substantially on the line 8—8 of FIGURE 7.

FIGURE 9 is a side elevational view of a caster unit provided with improved shock absorbing means according to the present invention.

FIGURE 10 is a front elevational view of the caster unit shown in FIGURE 9.

Figure 1:
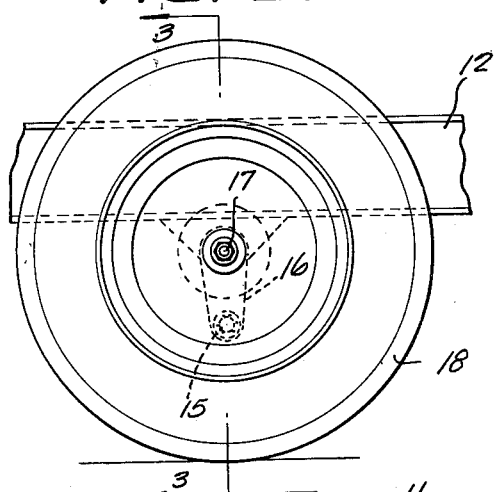
FIGURE 1 is a side elevational view of a wheel connected to a vehicle frame by an improved shock absorbing assembly constructed in accordance with the present invention.
Figure 2:
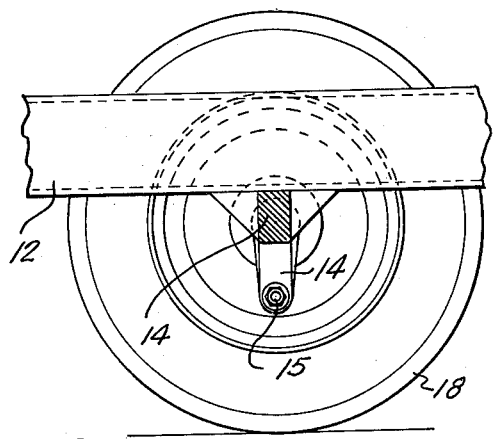
FIGURE 2 is a vertical cross sectional view taken substantially on the line 2—2 of FIGURE 3.

Referring to the drawings, and more particularly to FIGURES 1 to 4, 11 designates generally the frame of a vehicle including a pair of longitudinal side bars 12, 12 connected by transversely extending cross bars 13. One or more of the cross bars 13 may be provided at its opposite ends with downwardly and outwardly inclined depending supporting arm portions 14, 14 in which are journaled respective horizontal stub shafts 15 integrally formed on the lower ends of respective, generally Z-shaped link bars 16. The top ends of the link bars comprise the outwardly extending horizontal stub shafts 17 on which are journaled respective ground-engaging, load-supporting wheels 18. As will be readily apparent from FIGURE 3, the wheel centers are located above the points of connection of the link bars to the vehicle frame 11, since the horizontal axles 17 are spaced above the horizontal axles 15.

Figure 3:
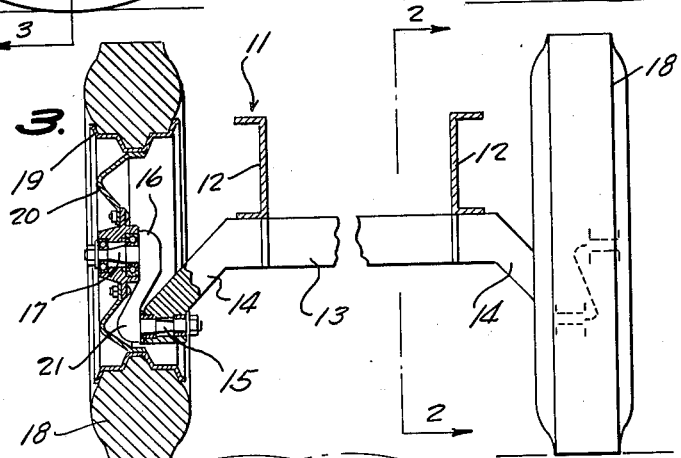
FIGURE 3 is a transverse vertical cross sectional view taken substantially on the line 3—3 of FIGURE 1.

As will be further apparent from FIGURE 3, the wheels 18 are provided with rims 19 on wheel discs which are formed with the annular, inwardly concave corrugations 20 whose radius is substantially the same as the distance between the axes of the axles 17 and 15, and the link bars 16 being of generally Z shape, as shown in FIGURE 3, are so arranged so that their bottom knee portions 21 are received within the annular corrugations 20 and are freely swingable therein. It will be further noted from FIGURE 3 that the connections between the arms 14 and the lower ends of the link members 16 are almost wholly contained within the space defined between the two outside vertical planes of the wheels 18 so that the journal connections of the axle elements 15 are housed substantially within the annular wheel rims 19.

Because of the journal connections of the axles 17 and 15, the axes of the wheels 18 are arcuately movable relative to the axes of the axle elements 15, so that the wheels are swingable around the link connections between the arms 14 and the link members 16. Thus, when the vehicle travels over an obstruction, such as the obstacle or rib 23 shown in FIGURE 4, the wheel axis travels along a path designated by the broken line 24 in FIGURE 4, whereas the axis of the connection between the arm 14 and the associated wheel axle 15 travels along a path designated by the broken line 25. It will be seen from FIGURE 4 that when the wheel encounters the leading edge of the obstacle 23 the path of movement of its axis changes sharply in direction, as shown by the relatively sharp angular discontinuity 26 in the path of movement 24. However, due to the fact that the wheel is swingable with respect to the frame 11, the path of movement of the connection between the axle 15 and the adjacent arm 14 is not sharply angled at this region, but instead changes in a gradual manner, as shown by the arcuate bend 27 in the path of movement 25 as the wheel moves on the leading corner 28 of the obstacle 23. A generally similar but reverse action occurs as the wheel rolls off the trailing corner 29 of the obstacle, where again the path of movement 24 of the wheel axis contains a sharply angled discontinuity 28, whereas the change in direction in the path of movement 27 comprises a gradually curving or arcuate portion 29 at this region.

Figure 4:
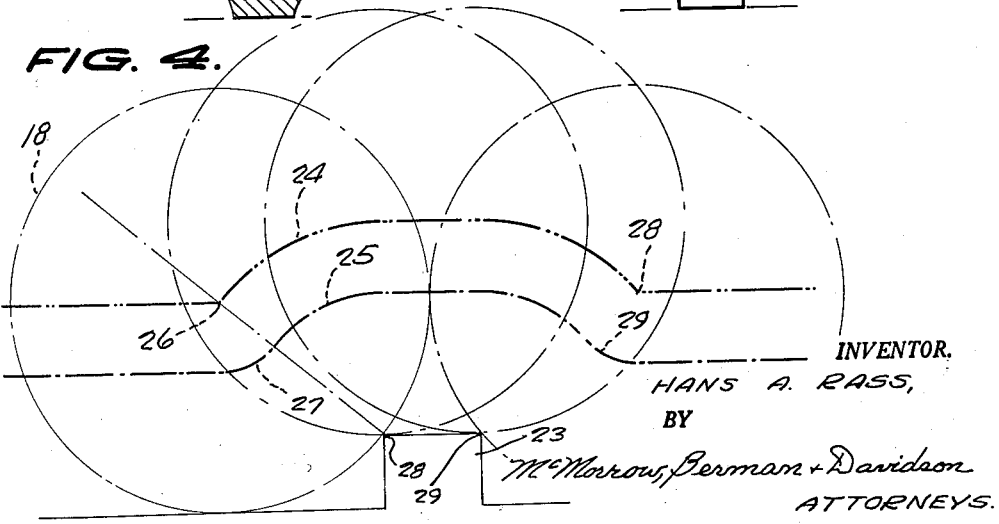
FIGURE 4 is a diagram illustrating the path of movement of the wheel in the assembly of FIGURES 1 to 3 as the wheel passes over an obstacle, and further illustrating the restricted paths of movement of the wheel axis and the point of connection of the vehicle frame to the shock absorbing assembly.

FIGURE 4, otherwise interpreted, means that there is a minimum of shock or vibration imparted to the vehicle when a wheel thereof passes over an obstacle 23, or similar obstruction, due to the fact that although the wheel changes sharply in direction as it rolls on a corner portion of the obstacle, the frame itself does not change suddenly in direction but instead is gradually changed in direction to follow the wheel. The link suspension above described therefore serves to smooth out the path of movement of the vehicle frame and to minimize shocks to the vehicle frame when the vehicle passes over obstructions or obstacles in its path of movement.

It will be readily apparent that the suspension above described is applicable to a wide range of vehicles, including automobiles, trailers, trucks, or the like. The improved shock absorbing assembly is also applicable to various other types of load-supporting assemblies, for example, to wheelbarrows and to casters, as illustrated respectively in FIGURES 5 to 8, and in FIGURES 9 and 10.

Referring to FIGURES 5 to 8, a wheelbarrow is generally designated at 31, said wheelbarrow comprising a load-supporting frame 32 which is formed at its forward ends with the respective depending downwardly and forwardly arcuately curved supporting arms 33, 33. A load-supporting wheel 34 is journaled at 60, 60 to the intermediate portions of the respective side arms 35, 35 of a generally U-shaped, downwardly facing yoke member 36' which overlies the wheel 34 and which is received beneath the body 37 of the wheelbarrow and is freely movable with respect to said body. The lower ends of the side arms 33, 33 are pivotally connected to the lower end portions of the side arms 35, 35 by horizontal axles 36, 36, so that the axis of the wheel 34 is arcuately movable around the common transverse axis defined by the axles 36, 36. As shown in FIGURE 8, the end of each supporting arm 33 is formed with a horizontal sleeve 38 provided with a bearing bushing 39 through which the associated axle 36 extends, connecting the lower end of the arm 33 to the adjacent side arm 35 of the link member 36'. Surrounding each sleeve 38 is a coiled spring 40 having one end thereof secured to the adjacent supporting arm 33, as shown at 41, and having the other end thereof secured to the adjacent side arm 35 of the link member 36', so that the member 36' is biased substantially to a vertical position beneath the wheelbarrow body 37.

As will be readily apparent, the springs 40 cooperate to yieldably oppose movement of the axis of the wheel 34 around the transverse horizontal axis defined by the axle elements 36, 36, and therefore serve as a cushioning means, cooperating with the wheel suspension to provide absorption of shocks and to minimize transmission of the shocks encountered by the wheel 34 to the frame 32. However, the shock absorbing action of the suspension for the wheel of the wheelbarrow shown in FIGURES 5 to 8 primarily is derived from the same theoretical considerations as are involved in connection with the wheel suspension illustrated in FIGURES 1 to 4 and diagrammatically explained in FIGURE 4.

Referring to FIGURES 9 and 10, 50 generally designates a caster comprising a supporting frame 51 which is of generally inverted U-shape, provided with the depending side arms 52, 52. A generally U-shaped link member 53 is disposed in the U-shaped frame 51 and the lower end portions of the side arms of the U-shaped member 53 are pivotally connected at 55, 55 to the lower end portions of the side arms 52, 52. A load supporting wheel 56 is journaled to the intermediate portions of the side arms of the link member 53, as shown at 57, 57, whereby the wheel 56 is connected to the frame member 51 by a link suspension similar to that described in connection with the wheelbarrow of FIGURES 5 to 8, and providing the same shock-absorbing characteristics explained in connection with the wheel suspension illustrated in FIGURES 1 to 3 and diagrammatically explained in FIGURE 4.

As in the previously described forms of the invention, in the case of the caster of FIGURES 9 and 10, the axis of the wheel 56 is arcuately movable around the transverse common axis defined by the pivot elements 55, 55, connecting the link member 53 to the lower ends of the side arms of the frame member 51.

While certain specific embodiments of an improved shock absorbing assembly for use between a frame and a load-supporting wheel have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle, a frame member, oppositely directed downwardly and outwardly inclined supporting arms on said frame member, respective wheels adjacent said arms, each wheel having a hollow rim receiving the lower portion of the adjacent arm therein, and a generally Z-shaped link member housed in each rim, each link member having an inwardly extending stub shaft on its bottom end rotatably engaged with the lower end of the adjacent supporting arm and an outwardly extending stub shaft on its top end rotatably engaged with the center of the adjacent wheel, the journal connections of the inwardly extending stub shafts being housed substantially within the hollow wheel rims, said link members swingably supporting said frame member from said wheels and allowing arcuate movement of the axes of the wheels relative to said supporting arms.

2. In a vehicle, a frame member, oppositely directed downwardly and outwardly inclined supporting arms on said frame member, respective wheels adjacent said arms, each wheel having a hollow rim mounted on a wheel disc and receiving the lower portion of the adjacent arm therein, and a generally Z-shaped link member housed in each rim, each link member having an inwardly extending stub shaft on its bottom end rotatably engaged with the lower end of the adjacent supporting arm and an outwardly extending stub shaft on its top end rotatably engaged with the center of the adjacent wheel, the journal connections of the inwardly extending stub shafts being housed substantially within the hollow wheel rims, said link members swingably supporting said frame member from said wheels and allowing arcuate movement of the axes of the wheels relative to said supporting arms, said wheel discs being concentrically formed with annular inwardly concave corrugations and the link members having knee portions at their bottom ends received in and being freely swingable in said corrugations.

References Cited in the file of this patent

UNITED STATES PATENTS

| | | |
|---|---|---|
| 1,065,936 | Gatermann | July 1, 1913 |
| 2,558,311 | Morrow | June 26, 1951 |
| 2,609,212 | McMurtrie | Sept. 2, 1952 |
| 2,857,169 | Spannhake | Oct. 21, 1958 |

FOREIGN PATENTS

| | | |
|---|---|---|
| 78,172 | Germany | Mar. 8, 1894 |
| 557,999 | Great Britain | Dec. 15, 1943 |